(No Model.)

P. P. ARMOUR.
HORSE COLLAR FASTENER.

No. 444,625.  Patented Jan. 13, 1891.

Witnesses
Geo. W. Young.
Lawson Scott

Inventor
Perley P. Armour
By H. G. Underwood
Attorney

UNITED STATES PATENT OFFICE.

PERLEY P. ARMOUR, OF BURLINGTON, WISCONSIN.

HORSE-COLLAR FASTENER.

SPECIFICATION forming part of Letters Patent No. 444,625, dated January 13, 1891.

Application filed July 26, 1890. Serial No. 359,977. (No model.)

*To all whom it may concern:*

Be it known that I, PERLEY P. ARMOUR, of Burlington, in the county of Racine, and in the State of Wisconsin, have invented certain new and useful Improvements in Horse-Collar Fasteners; and I do hereby declare that the following is a full, clear, and exact description thereof.

My invention relates to appliances for attaching horse-collars to the animal's neck; and the object of my invention is to facilitate the application and removal of the collar.

To the above purpose my invention consists in certain peculiar and novel features of construction and arrangement as hereinafter described, and pointed out in the appended claims.

Figure 1:
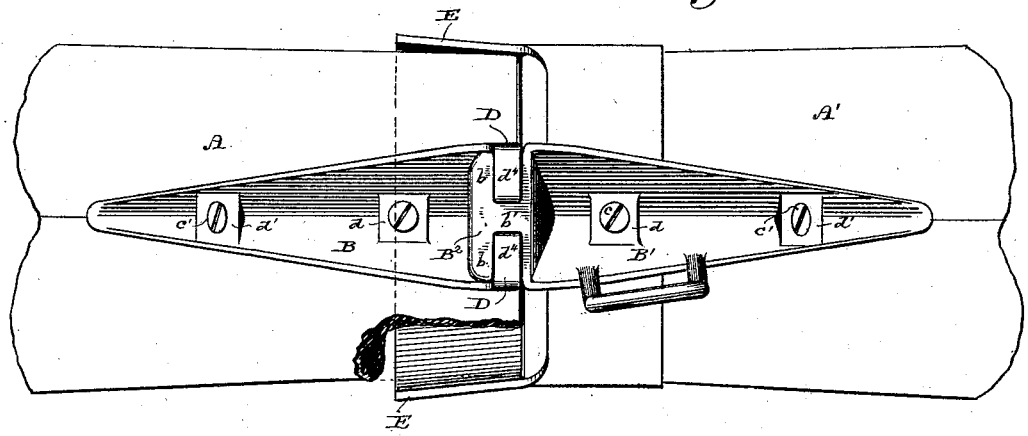
Figure 2:
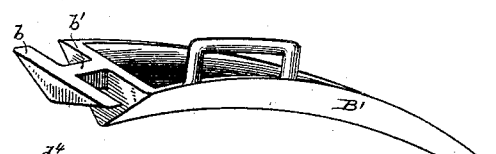
Figure 3:
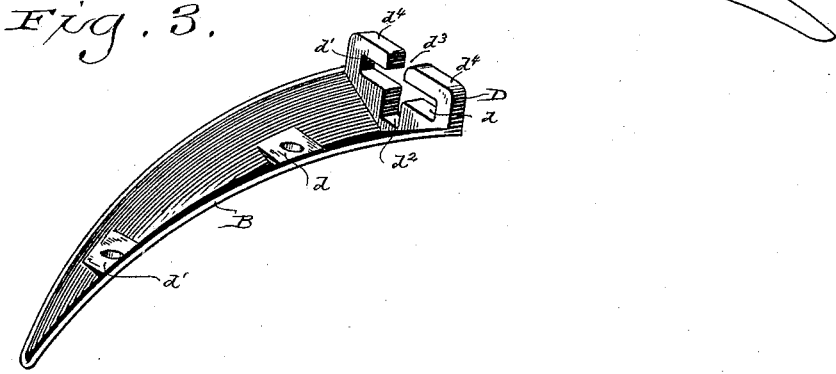

In the drawings, Figure 1 is an under side view of my improved collar fastener detached. Fig. 2 is a perspective view of the headed member of the fastener, and Fig. 3 is a similar view of the socket member.

Referring to the drawings, A A' designate the lower ends of a horse-collar, or, in other words, the ends which come beneath the animal's throat when the collar is in working position.

B B' designate the two parts of my improved attaching device. The parts B and B' are shown as attached to the ends A A', respectively, of the collar by screws $c\ c'$. Each of these fastening members is preferably of V form longitudinally and in cross-section, and each is formed on its under or concave side with two or more bosses or enlargements $d\ d'$, which are provided each with an internal socket or opening to receive the attaching-screws $c\ c'$. The larger end of the member B is formed or provided with a socket-piece D. This socket-piece is formed with two slots or openings extending at right angles to each other. The horizontal slot is closed at each end $d^5\ d^6$, and the lower portion $d^2$ of the vertical slot is closed, but the upper portion of the vertical slot $d^3$ is an open slot. This vertical slot $d^2\ d^3$ extends transversely to the length of the socket-piece D, and by reason of its open upper end $d^3$ and the location of the horizontal slot just described, two inwardly-extending oppositely-disposed arms $d^4\ d^4$ are formed on the said socket-piece.

The opposing member B' of the device is formed with a T-head $B^2$. From this description it will be seen that the lower ends A A' of a collar can be readily attached and disconnected by inserting the stem $b'$ of the head $B^2$ into the opening $d^3$ of the socket-piece D. It will be observed that simple and direct movements only are required in attaching and detaching the two fastening sections, and that all twisting, turning, and lateral movements of the sections are avoided in attaching and detaching the same.

In order to prevent any chafing of the animal's neck, a broad strap E is wrapped around the adjacent ends of the collar, and both ends of this strap are shown as secured beneath member B' of the attaching device by the screw $c$ thereof. It is obvious that the ends of the strap may, if desired, be secured beneath the member B of the attaching device by the screw $c$ thereof, but in either event the strap prevents chafing of the animal's throat when the collar is in use.

Having thus described my invention, what I claim as new therein, and desire to secure by Letters Patent, is—

1. An improved horse-collar fastener consisting of two oppositely-acting members, one of which is provided at its engaging end with a T-shaped head and the opposite member of which is provided at its engaging end with a laterally-extending socket-piece having two slots extending at right angles to each other, one of said slots extending transversely to the length of the socket-piece and being open at its outer end, substantially as set forth.

2. The combination, with a horse-collar, of two V-shaped coupling members having perforated bosses and secured to opposite ends of the collar, one of the members having at one end a lateral socket-piece which is formed with two slots extending at right angles to each other, one of which slots extends transversely to the length of the socket-piece and is open at its outer end, and the opposite member having at one end a T-shaped head to engage said socket, substantially as set forth.

In testimony that I claim the foregoing I have hereunto set my hand, at Burlington, in the county of Racine and State of Wisconsin, in the presence of two witnesses.

PERLEY P. ARMOUR.

Witnesses:
T. M. KEARNEY,
L. H. ROHR.